United States Patent [19]

Harding

[11] 4,202,521

[45] May 13, 1980

[54] COMBINATION BAG HOLDER AND DOLLY

[76] Inventor: Frank M. Harding, 1303 Brush Hill Cir., Naperville, Ill. 60540

[21] Appl. No.: 963,302

[22] Filed: Nov. 24, 1978

[51] Int. Cl.² ............... A63B 55/08; B65B 67/04
[52] U.S. Cl. ........................... 248/98; 248/99
[58] Field of Search ............... 248/95, 97–99, 248/101

[56] References Cited

U.S. PATENT DOCUMENTS

| | | | |
|---|---|---|---|
| 1,832,561 | 11/1931 | Kleinberg | 248/101 |
| 3,041,026 | 6/1962 | Wilson | 248/98 |
| 3,352,520 | 11/1967 | Bumgarner et al. | 248/97 X |
| 3,754,771 | 8/1973 | Shagoury | 248/98 X |
| 4,124,185 | 11/1978 | Preisinger | 248/98 |

FOREIGN PATENT DOCUMENTS 1175963  1/1970  United Kingdom ............... 248/98

*Primary Examiner*—James C. Mitchell
*Attorney, Agent, or Firm*—Mason, Kolehmainen, Rathburn & Wyss

[57] ABSTRACT

A combination bag holder and dolly characterized by the fact that the bag holder is adapted to grip the open end of a refuse bag by a simple movement of a portion of the bag holder frame; by being adaptable to refuse bags of varying sizes; by having the bag holder readily removable from the dolly for mounting on a stationary wall when there is no occasion for it to be mounted on the dolly; by the dolly being collapsible to a substantially flat configuration for ready storage; and by having the bag holder frame roughened or otherwise given a non-slip characteristic so as to more readily grip and hold the open end of the bag.

7 Claims, 6 Drawing Figures

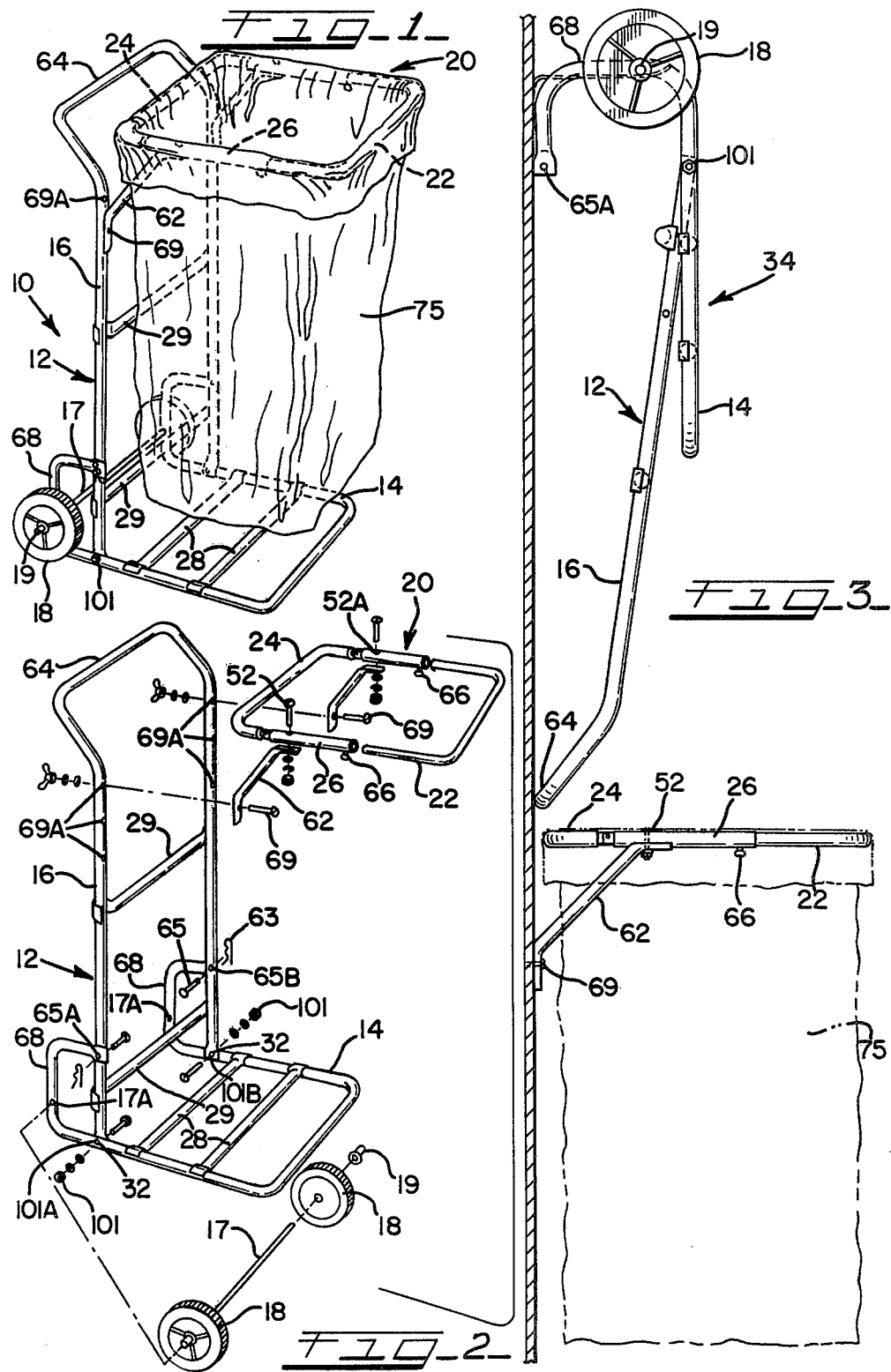

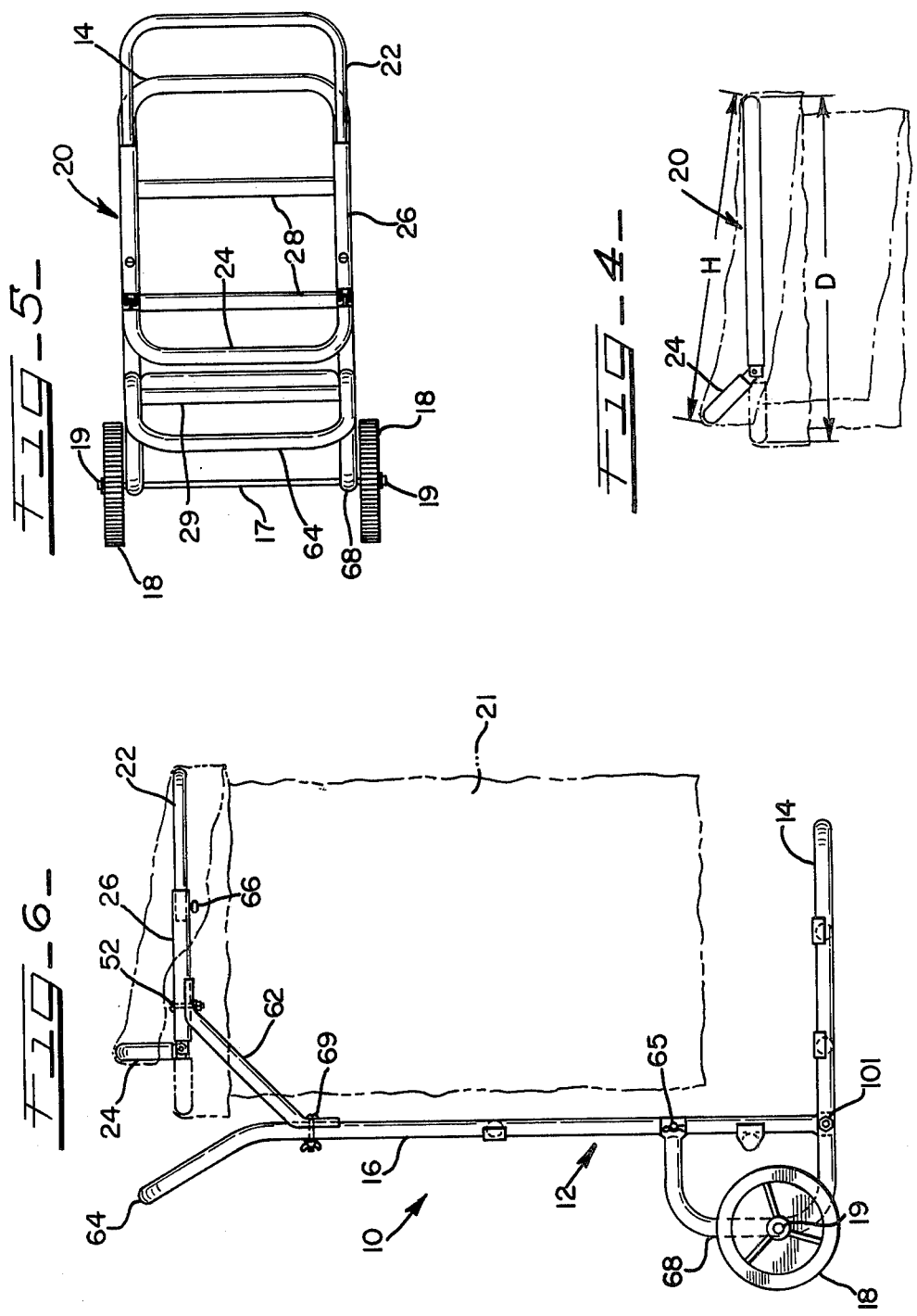

COMBINATION BAG HOLDER AND DOLLY

BACKGROUND OF THE INVENTION

There are many lawn care dollies on the market which incorporate a frame of some type for holding the refuse bag, but in most cases the means provided for supporting the refuse bag and holding it in an open position is complicated, cumbersome and awkward to use. Furthermore, they are not adaptable to bags of different sizes nor do many of them provide for simple foldability for storage when not in use.

For example, in Wilson U.S. Pat. No. 3,041,026 a sack cart is shown having a U-shaped frame for supporting a sack used for harvesting beans, walnuts, etc., and in this case, the sack is impaled upon prongs 32 in order to hold the sack open. This method of supporting the open end of a bag is entirely unsuitable for plastic bags of the type commonly sold today as trash bags, as the prongs would tend to tear the bags and would therefore be totally unsatisfactory. While it is true that the base 17 and the bag holder frame 24 are pivoted to provide for easy storage of the cart, it will be noted that the wheels are so positioned that the cart is only suitable for the single purpose of effectively mounting a sack and cannot be used satisfactorily as a dolly when the bag supporting frame is removed.

In Ryan U.S. Pat. No. 3,329,382 there is a garbage bag holder disclosed which has what is described as a concertina action because of the vertical pivots which are incorporated in the frame, but it will be noted that in this arrangement there is no reduction in the circumference of the bag holder frame which allows for the mounting of the bag with the circumference of the frame being increased for locking the upper end of the bag in place.

Byers U.S. Pat. No. 2,455,729 is another typical patent showing the sack holder on a dolly which exhibits the many disadvantages which the present invention seeks to overcome.

In my design U.S. Pat. No. Des. 245,222 there is no disclosure of any means for mounting a trash bag on the frame, or accommodating bags of different sizes, or of gripping a bag, and, of course, nothing about being detachably mounted on a collapsible dolly.

SUMMARY OF THE INVENTION

Almost everyone experiences the ever increasing problem of finding space to store equipment that is not needed at the moment but wanting it readily available when it is needed. Anyone who owns or rents a home sooner or later finds need for a convenient means for bagging leaves, trash, or the like, but to provide a dolly for the sole purpose of supporting a trash bag when the need occurs and for transporting it does often create a storage problem when the dolly is not in use for this purpose.

The principal object of this invention is to provide a combination dolly and bag supporting device in which the dolly can be used separately or conjointly with the bag holding device, with the latter being capable of being dismounted from the dolly and attached to a wall fixture when that is convenient and desirable, thus making the dolly available for use in carrying other loads.

It is a further object of the invention that the means for supporting the open end of a bag is adaptable to bags of different diameters, with the bag supporting frame being easily operable for securing the open end of the bag to the frame and hold it in a taut, open position.

In the preferred embodiment of the invention this is accomplished by having the fixed U-shaped horizontal frame extensible to accommodate bags of larger sizes with the pivoted U-shaped frame being used as the means for stretching the bag to a taut, open position. Of course, the extension could be a part of the pivoted frame.

DESCRIPTION OF THE DRAWINGS

FIG. 1 is a perspective view of a preferred embodiment of this invention;

FIG. 2 is an exploded perspective view of the bag holder and dolly of FIG. 1;

FIG. 3 is a side elevational view of a dolly in a collapsed form and alternate use for said bag holder;

FIG. 4 is a side elevational view showing the manner in which the bag is held in place;

FIG. 5 is a top view of the dolly and bag supporting frame illustrated in FIG. 6.

FIG. 6 is a side elevational view of the bag holder and dolly of the present invention.

DESCRIPTION OF THE PREFERRED EMBODIMENT

The new and improved combination bag holder and dolly, generally designated 10, preferably includes a frame 12 which has a platform section 14 generally horizontally disposed, and an upstanding section 16, which is substantially at a right angle with the platform section 14. The frame 12 is constructed from heavy duty metal tubing. The platform section includes two spaced apart generally horizontally disposed platform braces 28. To the rear of the platform section 14 are located a pair of metal tubing pieces which are bent upwardly and forwardly and form axle braces 68. The axle braces 68 are formed on each side of the dolly 10. Through the axle braces 68 are drilled two generally cylindrical bores 17A which receive an axle 17. A pair of dolly wheels 18 are secured to the axle with suitable washers and a pair of axle cap nuts 19. The location of the axle and wheel arrangement at a position to the rear of the upstanding portion 16 of the dolly makes it possible to use the dolly 10 without obstructing the placement of baggage or other carriables upon the platform section 14.

The upstanding section 16, as mentioned above, is constructed of material similar to the materials used in the construction of the platform section 14. The upstanding section 16 includes at the top of the section 16 an upwardly and rearwardly extending handle 64. Integral with the upstanding section 16 are transversely running braces 29. The upstanding section 16 is hinged to the platform section 14 at pivot points 32 and is secured thereto by a pair of 5/16" bolts, which are inserted through the apertures 101A of the platform section 14 and 101B of the upstanding section 16 and held in place by nuts 101. At a point located above the pivot point 32, and also on the upstanding section 16, the axle brace 68 is contour flattened and intersects the upstanding section 16. At this point aligned apertures 65A and 65B are provided in the axle brace 68 and the upstanding portion portion 16, and through these apertures removable pins 65 are inserted from the inside of the upstanding section 16 and secured against disengagement by cotter pins 63. Insertion of the pins 65 through the apertures 65A and 65B prevents the upstanding section 16 from pivoting about the point 32 and a resultant stable structure is obtained as illustrated in FIGS. 1 and 6.

Removal of the cotter pins 63 and the pins 65 allows the dolly portion of the present invention to be folded into a collapsed substantially flat configuration 34 as illustrated in FIG. 3 therefore allowing for ease of storage when the dolly is not in use. If desired, the platform 14 could be dimensioned to mount interiorly of the vertical section 16 to facilitate folding.

The bag holding frame generally designated 20 is best illustrated in FIGS. 2, 3, and 6, the bag holding frame 20 includes a pivoted U-shaped portion generally designated 24 which is preferably located adjacent to the upright section 16 of the dolly frame.

The bag holding frame 20 is of generally rectangular form and includes, in addition to the pivoted U-shaped portion 24, a fixed section 26 and a front telescoping portion 22. The fixed section 26 comprises straight hollow tubing which is securely mounted to the upright portion 16 of the dolly frame by means of an angle bracket 62 which is secured at its upper end to the bag holding sections 26 by means of securing bolts 52 which pass through apertures 52A in the members 26 and through flattened portions on the angle brackets 62 to hold the members 26 firmly on the angle brackets.

The lower ends of the angle brackets are adapted to be secured at selected positions along the upright frame of the dolly 16 and to this end a number of openings 69A are provided in the upright members so that the bag holding frame may be positioned at the appropriate height for the particular bag that is to be used on the frame. Bolts 69 held in place by wing nuts make adjustability of the vertical height of the bag holding frame with respect to the dolly a simple matter.

The U-shaped outer portion of the bag holding frame 20 may be received either externally or internally (in the embodiment shown, internally) and thumb screws 66 on the fixed section 26 allow the U-shaped member to be adjustably positioned inwardly or outwardly to accommodate the particular bag size that is being used.

It will be understood that when the bag holder has been adjusted to the desired height and to the desired circumference for the particular bag to be used, bag 21 is inserted interiorly within the frame while the pivot section 24 is in its raised position and the edges of the bag are folded over the thus foreshortened circumference of the bag holding frame as indicated more particularly in FIG. 4, and then when the hinged section 24 is moved to a horizontal position and preferably slightly beyond a dead center position, the bag is stretched and thereby held in locked position while it is to be filled.

In the preferred embodiment of the invention, the bag holder frame 20 is coated with a non-skid surface so as to prevent bags from slipping from the frame once they are so placed. This non-skid surface may be created in many fashions. Either a plastic coating with non-skid characteristics may be applied or a mixture of paint and fine sand may be used to coat the frame. Another way would be to roughen the surfaces, as by sand blasting.

When the dolly is to be stored in collapsed condition as shown in FIG. 3, the bag holder frame 20 may be remounted on an adjacent wall 30, in which position it may function to receive trash and is merely stationary rather than mobile. As will be seen by referring to FIG. 3, the angle support 62 is merely removed from the upstanding portion 16 of the dolly and is transferred to the wall 30 at an appropriate height where disposable bags 75 may be removably secured to the bag holder frame 20 to receive and hold trash. When the occasion again requires the mounting of the bag holding frame on the dolly, the latter may be reassembled by merely folding out the lower section of the dolly and reinserting the pins through the contoured flattened sections of the axle brace 68 and then remounting the bag holding frame on the upright portion 16 of the dolly as previously explained.

As discussed, one of the novel features of the present invention, in addition to others, is that the rear section 24 of the bag holding frame 20 is pivotal, thereby allowing for a unique method of gripping and holding a bag. When the bag holding frame section 24 is in the inclined position, and a bag of appropriate size is interiorly placed in and over the frame, the distance H is minimal, thereby allowing for easy mounting of the bag. The pivoted U-shaped portion 24 may then be lowered to horizontal position, thereby increasing the bag frame length to D, therefore holding the bag firmly in place with the aid of the non-skid bag frame surface.

It is to be understood that the form of the invention herein described is to be taken as an example of the same, and that the various changes in the shape, size and arrangement of parts may be resorted to without departing from the spirit of the invention or scope of the subjoined claims.

What is claimed and desired to be secured by U.S. Letters Patent is:

1. A combination bag holder and dolly of the type in which a dolly frame comprising a platform section and an upstanding section are mounted on a pair of dolly wheels, and in which a bag holding frame is rigidly supported above the platform section on the upstanding section of the frame;

the improvement in which the bag holder frame is adapted to accommodate bags of different cross sectional areas, and comprises a horizontally movable U-shaped member, the legs of which are secured to spaced supports on said upstanding section, and a pivoted U-shaped portion pivoted to said spaced supports and movable between a horizontal position and an inclined position whereby the open end of a bag may be interiorly mounted within said bag holding frame and have its open edges folded over the frame while the pivoted section is in its inclined position and then stretched to a taut, open position as the pivoted section is moved toward a horizontal position, and means for securing said horizontally movable U-shaped member to said spaced supports in a number of positions to adjust to the cross sectional area of the particular bag being mounted on said bag holding frame.

2. A combination bag holder and dolly as in claim 1 in which the spaced supports are lengths of parallel round tubing, and the horizontally adjustable U-shaped member of the bag holding frame is U-shaped round tubing, the legs of which telescopically engage the fixed spaced parallel tubing.

3. A combination bag holder and dolly as in claim 1 in which a bag holding frame may be readily removed from the dolly for mounting on a wall structure.

4. A combination bag holder and dolly as in claim 1 in which the platform of the dolly may be pivoted to an upright position adjacent to the upstanding section of the dolly and in which the dolly wheels are mounted rearwardly of the pivot for the platform section of the dolly.

5. A combination bag holder and dolly as in claim 1 in which the bag holder frame is adjustable to different positions on the upstanding section of the dolly to accommodate bags of differing depths.

6. A combination bag holder and dolly as in claims 1 or 2 in which the pivoted U-shaped portion of the bag holding frame is also round tubing bent to U-shaped form whereby the open end of a bag supported by said bag holding frame is supported substantially entirely on said round tubing.

7. A combination bag holder and dolly as in claim 6 in which the bag holding frame has an antiskid surface to enhance the securement of the bag to the frame.

* * * * *